United States Patent [19]

Rye et al.

[11] Patent Number: 4,928,741
[45] Date of Patent: May 29, 1990

[54] RUBBER TIRE HAVING POLYVINYLIDENE CHLORIDE/ELASTOMER INNER LINER COATING

[75] Inventors: Grover W. Rye; John C. Pitman, both of Cuyahoga Falls, Ohio

[73] Assignee: The Goodyear Tire & Rubber Company, Akron, Ohio

[21] Appl. No.: 200,878

[22] Filed: Jun. 1, 1988

Related U.S. Application Data

[63] Continuation-in-part of Ser. No. 931,370, Nov. 14, 1986, abandoned.

[51] Int. Cl.$^5$ .............................................. B60C 5/14
[52] U.S. Cl. ..................................... 152/504; 152/510
[58] Field of Search ....... 152/502, 503, 504, DIG. 16, 152/510; 428/518

[56] References Cited

U.S. PATENT DOCUMENTS

| | | | |
|---|---|---|---|
| 3,299,934 | 1/1967 | Pace | 152/510 |
| 4,239,799 | 12/1980 | Weinberg et al. | 428/335 |
| 34,808,177 | 4/1974 | Thaler et al. | 260/80.7 |

FOREIGN PATENT DOCUMENTS

| | | |
|---|---|---|
| 0200898 | 12/1986 | European Pat. Off. |
| 47-31761 | 8/1972 | Japan . |
| 55-162704 | 6/1982 | Japan . |
| 2023516A | 1/1980 | United Kingdom . |

OTHER PUBLICATIONS

"Modern Plastics Encylopedia", 1984-1985, pp. 94 and 96, pub. by McGraw-Hill, 1984.
"The Condensed Chemical Dictionary", 10th ed. pp. 139 and 268, pub. by Van Nostrand Reinhold Company, 1981.
G. J. Van Amerongen, *Rubber Chemistry and Technology*, vol. 37, pp. 1065-1152 (1964).
"The Condensed Chemical Dictionary", 10th ed., 1981 revised by G. G. Hawley, p. 888; published by Van Nostrand Reinhold Company, New York and Cincinnati.

*Primary Examiner*—Raymond Hoch
*Attorney, Agent, or Firm*—Henry C. Young, Jr.

[57] ABSTRACT

A rubber tire having a vinylidene chloride copolymer/elastomer polymer blend inner liner is disclosed. This coating may be about 1 to 3 mils thick. The polymer blend has low air permeability, high elongation, low modulus and excellent flex resistance. The polymer blend may be prepared by combining an aqueous vinylidene chloride copolymer emulsion adjusted to pH of about 6.5 to about 8, with an elastomer latex, and applying the resulting mixed emulsion by conventional techniques to the inner surface of the carcas of inner liner of a green tire.

14 Claims, 1 Drawing Sheet

_ _ _ _

RUBBER TIRE HAVING POLYVINYLIDENE CHLORIDE/ELASTOMER INNER LINER COATING

CROSS REFERENCE TO RELATED APPLICATION

This application is a continuation-in-part of our co-pending application Ser. No. 931,370 filed Nov. 14, 1986, now abandoned.

TECHNICAL FIELD

This invention relates to rubber tires having inner liners, and to compositions used in the coating of such inner liners. More particularly, this invention relates to rubber tires having, as an inner liner coating, a blend of polyvinylidene chloride and an elastomer.

BACKGROUND ART

The inner surface of a pneumatic rubber tire is typically composed of a rubbery, elastomeric composition designed to prevent or retard the permeation of air and moisture into the carcass from the tire's air chamber. The portion of the tire containing such inner surface is often referred to as an inner liner. Inner liners have been used for many years in tubeless, pneumatic vehicle tires to retard or minimize the escape of air used to inflate the tire, thereby maintaining tire pressure.

Rubbers which are relatively impermeable to air are often used as a major portion of such inner liners. These can include butyl and halobutyl (e.g. chlorobutyl and bromobutyl) rubbers. U.S. Pat. No. 3,808,177 discloses other polymers which may also be relatively impermeable.

The inner liner forms the inner surface of a tire and has, as an important purpose, to reduce the air permeability of the tire. Typically, the inner liner is applied to the inner surface of the tire carcass while both are in the treen or uncured state. When the tire is cured, such inner liner becomes an integral, co-cured part of the tire. Other techniques are used in some cases; for example, U.S. Pat. No. 3,299,934 discloses application of a cured polyurethane in the form of a solution to the inner surface of a tire.

Rubber composition-based inner liners add both weight and cost to the manufacture of a tire. Relatively thick inner liner coatings are generally necessary to obtain the desired degree of air impermeability; the added weight and cost are largely attributable to the thickness of coating desired.

Rubber tires having a thin coating of polyvinylidene chloride on the inner surface of the tire for the purpose of reducing the tire's air permeability are known. Such coatings are disclosed, for example, in United Kingdom published patent application GB 2 023 516A and in Japan patent publication No. 31761/1972. The latter reference also discloses vinylidene chloride copolymer coatings for the same purpose.

Polyvinylidene chloride (PVDC) and copolymers of vinylidene chloride (VDC) with other monomers (e.g., vinyl chloride and acrylonitrile) are thermoplastic materials which are known for their gas and vapor barrier properties. For example, VDC copolymer film is sold commercially under the name, "Saran," a trademark of Dow Chemical Co., for example for use as a wrapping material where low oxygen and water vapor permeability are required (in food wrapping, for example). However, PVDC and VDC copolymers tend to be brittle.

Thus, PVDC coatings on the inner surfaces of tires, such as those described in the aforesaid United Kingdom and Japan patent applications, are understood to be brittle. They have low elongation (a characteristic of brittle materials) and low flex resistance. Thus, although they impart low air permeability to the tire while the tire is new, they do not stand up under the normal flexing which a tire must undergo in service, and they crack and flake off long before the tire carcass and tread reach the end of their useful lives.

Blends of butyl rubber (maximum 10 percent by weight) with "Saran" (a vinylidene chloride-vinyl chloride copolymer containing a maximum of 5 weight percent of additional comonomers) and an epoxy resin, and packaging films made therefrom, which films are characterized by low oxygen permeability, and disclosed in U.S. Pat. No. 4,239,799. "Modern Plastic Encyclopedia 1984–1985," pages 94 and 96, disclosed that "Saran" may be alloyed with elastomeric materials to provide toughness down to minus 30° C. Neither proposes use of a "Saran"/rubber blend in tires. "Modern Plastics Encyclopedia" further discloses that VDC homopolymer has a melting point of 198°–205° C. and begins to decompose rapidly at 210° C., making it difficult to process, and that comonomers typically depress the melting point, making melt processing feasible.

DISCLOSURE OF THE INVENTION

It would be an advantage to provide a pneumatic rubber tire having an inner liner coating of low air permeability, high elongation, low modulus and high flex resistance.

This invention according to one aspect thereof provides an inner liner coating composition which is a polymer blend of low air permeability and high elongation, the polymer content consisting essentially of (1) from about 25 to about 85 percent by weight of a copolymer of vinylidene chloride (VDC) with one or more halogen-free comonomers in which said vinylidene chloride constitutes from about 80 percent to about 95 percent by weight of said copolymer, and (2) from about 75 to about 15 percent by weight of an elastomer, based on the total weight of the polymer present on the dry basis.

This invention according to another aspect provides a process for preparing a composite article comprising a rubber substrate and a coating of low air permeability and high elongation on at least one surface thereof, said process comprising mixing a polyvinylidene chloride emulsion with an elastomeric latex, applying the resulting polymer dispersion to at least one surface of the substrate, and evaporating the liquid medium. In particular, the composite article may be a rubber tire.

This invention according to still another aspect provides a coated rubber article comprising a cured rubber substrate and a coating of a polymer blend of low air permeability and high elongation on at least one surface of said substrate, said coating being a polymer blend comprising from about 25 to about 85 percent by weight of a copolymer of vinylidene chloride (VDC) with one or more halogen free comonomers in which said vinylidene chloride constitutes from about 80 percent to about 95 percent by weight of said copolymer, and (2) from about 75 to about 15 percent by weight of an elastomer, based on the total weight of polymer present.

PRACTICE OF THE INVENTION

This invention will now be described in detail with reference to preferred embodiments thereof.

Figure 1:
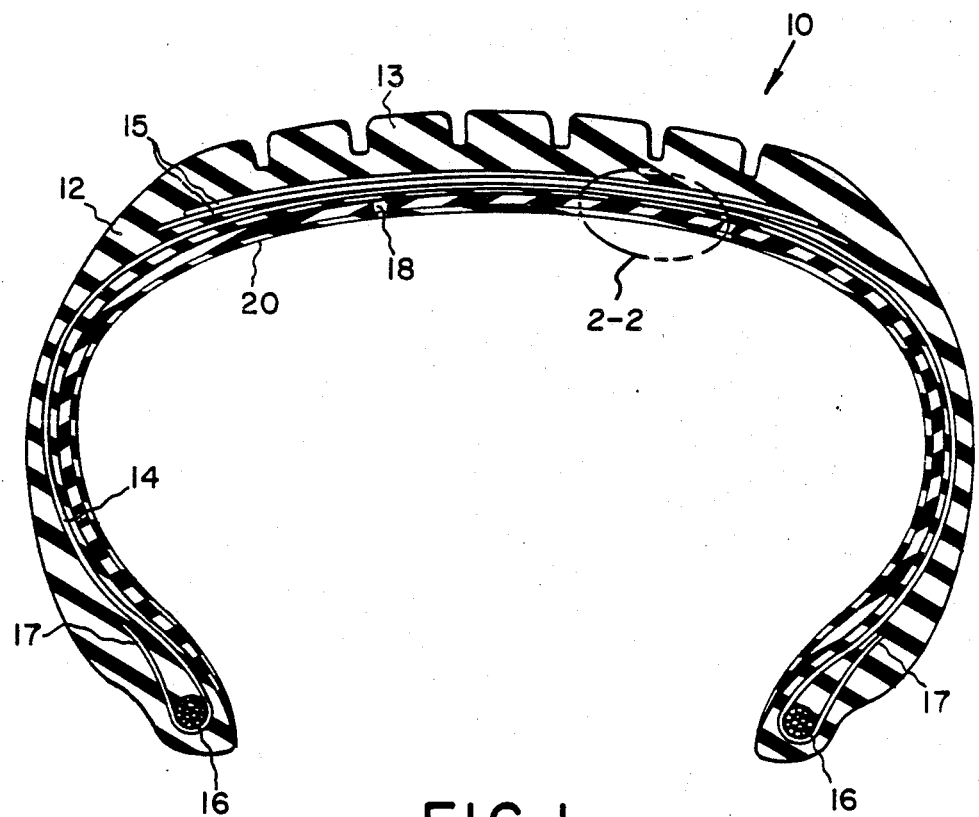
FIG. 1 is a cross-sectional view of a tire having an air barrier coating according to the invention.
Figure 2:
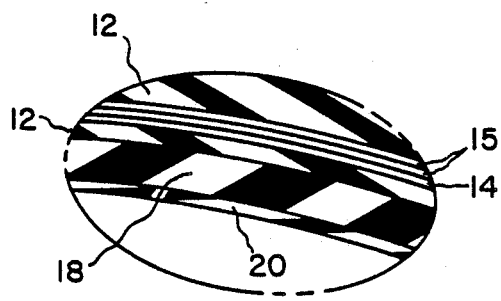
FIG. 2 is an enlarged cross-sectional view of a portion of the tire shown in FIG. 1.

A representative tubeless tire having an air barrier coating according to this invention is shown in FIG. 1. Referring to FIG. 1, 10 is a tubeless tire having carcass 12 and tread 13. Carcass 12 may be reinforced with one or more cords 14 and belt 15. The core 14 extends around beads 16 and terminates at ends 17 in the tire sidewalls. A cured rubber inner liner 18 may be adhered to the inner surface of carcass 12. This inner liner preferably extends over the entire inner surface of tire 10. The inner liner is made of a material (e.g., butyl or a halobutyl rubber or natural rubber) which has low air permeability and high elongation and flex resistance over the tire temperature range likely to be encountered by a tire in service. The tire structure described thus far may be conventional.

A thin air barrier coating 20 according to this invention covers the entire inner surface of tire 10. This coating is adhered to inner liner 18 or (where inner liner 18 is omitted) directly to the inner surface of carcass 12. This coating is typically very thin, e.g., it may have a thickness from about 1 to about 10 mils (about 0.001 to about 0.010 inches, or about 0.025 to about 0.25 cm), preferably from about 1 to about 5 mils. This coating has extremely low air permeability, even compared to inner liner materials now in use. For example, a 1 to 2 mil coating of this invention has approximately the same air permeability as a 30 mil thickness of halobutyl rubber. In addition, a coating of this invention has high elongation, low modulus and high flex resistance over the entire temperature range which may be encountered by a tire in service.

Tires having an air barrier coating 20 according to this invention are lighter in weight and lower in cost than conventional tubeless tires having a halobutyl inner liner. The very low air permeability of coating 20 makes it possible to reduce materially the thickness of the inner liner (which is typically about 20 to 40 mils thick) or even to eliminate the inner liner altogether. Alternatively, the air barrier coating of this invention makes it possible to use natural rubber (which has good mechanical properties but a much higher air permeability than butyl or halobutyl rubber) as the material for inner liner 18 is desired.

The air barrier coating 20 is a polymer blend film comprising (1) from about 25 percent or about 85 percent by weight of a copolymer of VDC with one or more halogen-free comonomers, such as acrylonitrile, methyl acrylate, butyl acrylate, or 1,3-butadiene, in which VDC constitutes at least about 80 percent by weight of the copolymer, and (2) from about 75 to about 15 percent by weight of elastomer. The amount of elastomer is sufficient to impart a quasi-elastomeric quality (including elongation of at least 50 percent) to the blend.

The tire carcass 12 may be of conventional cured rubber, or cured mixtures thereof, such as for example natural rubber, synthetic natural rubber (synthetic cis-1,4-polyisoprene), cis 1,4-polybutadiene, or styrene/butadiene copolymer (SBR) rubber. It is to be understood that such rubbers are compounded with typical rubber compounding ingredients which may conventionally include carbon black, zinc oxide, stearate or stearic acid, sulfur, accelerator(s) and optionally, rubber processing oil. Other ingredients might be used such as various antidegradants, pigments and conventional other compounding ingredients.

The material forming inner liner 18 (when present) may be a conventional inner liner material, such as natural rubber, butyl rubber, or halobutyl rubber. An inner liner of conventional thickness may be used; however, it is possible to reduce the thickness of the inner liner or to eliminate it entirely, because of the very low air permeability of the PVDC/elastomer coating.

The first step according to the practice of this invention is to provide a polymer blend emulsion comprising (1) from about 25 percent to about 85 percent by weight of a copolymer of vinylidene chloride (VDC) with one or more halogen-free comonomers in which said vinylidene chloride constitutes from about 80 percent to about 95 percent by weight of said copolymer, and (2) from about 75 percent to about 15 percent by weight of elastomeric material, based on the total weight (on the dry bases) of polymer present. In addition to the polymeric ingredients, this emulsion contains a liquid medium (preferably water) in which the polymeric ingredients are dispersed, and may contain a surfactant or emulsifying agent.

The vinylidene chloride polymer starting material is preferably an aqueous emulsion of a copolymer of VDC with one or more halogen-free comonomers, e.g., acrylonitrile, methyl acrylate, butyl acrylate or 1,3-butadiene. The VDC copolymers are those containing from about 80 to about 95 percent by weight of VDC and conversely about 15 to about 5 percent by weight of halogen-free comonomer, i.e. a comonomer other than vinyl chloride. Vinyl chloride, if present in these preferred copolymers, should be present only as an incidental impurity. Commercial VDC polymer emulsions, especially film coating and adhesive grades, are especially suitable as starting materials. Representative commercial VDC polymer emulsions which may be used include "Duran" 220, a VDC polymer containing at least about 90 weight percent VDC, and "Duran" 8350, a VDC adhesive grade copolymer emulsion, both made by W. R. Grace & Co. The VDC polymer emulsion typically has a polymer solids content of about 50 to about 60 percent by weight, although this is not critical, and a moderately to strongly acid pH, e.g., from about 2 to about 4. The emulsion may contain additional ingredients, e.g., one or more surfactants.

The elastomeric starting material is preferably an aqueous latex or emulsion of an elastomer. The elastomeric material is sulfur curable. Preferred elastomeric materials are neoprene, copolymers of acrylonitrile with various monomers, notably acrylonitrile-butadiene copolymer (e.g. "CHEMIGUM", which is a registered trademark of The Goodyear Tire & Rubber Company, butyl polymers (e.g. copolymers of isobutylene and isoprene), styrene-butadiene rubber (SBR), and vinyl pyridine terpolymer (e.g., vinyl pyridine-butadiene-styrene terpolymer). One of the monomers from which the elastomer is formed is a diene, such as 1,3-butadiene, so that the elastomer contains some carbon-to-carbon double bond unsaturation and is therefore curable. The elastomer is generally obtained in the form of a latex or emulsion in which the liquid medium is preferably water. In addition to the polymeric ingredient and water, the latex may contain other ingredients, such as soaps and surfactants. The latex typically has a pH from about 5.5 to about 10.5, more typically from about 7 to about 10, and typically has a polymer solids content in the range of about 40 to about 60 percent by weight, although this solids content is not critical. Commercial elastomer latexes may be used in the preparation of the mixed polymer emulsions of this invention.

The VDC copolymer emulsion is mixed with the elastomer emulsion by conventional processes, except for the applicant's pH adjustment procedure, to form a polymer blend emulsion.

The total amount of elastomeric material in the polymer blend emulsion is from about 15 to about 75 percent by weight, based on total polymer weight, dry basis. The elastomeric material content may be provided by one or more elastomeric materials.

Additional ingredients in the polymer blend emulsions of this invention may include surfactants or wetting agents, stabilizers, and thickeners. These ingredients should be added to the mixed VDC polymer/elastomer emulsion.

A suitable wetting agent has been observed to be "Aerosol OT," a surfactant made by the American Cyanamid Company. This has been observed to be important to wet the rubber surface and obtain a good continuous film.

It is highly desirable to add one or more stabilizers, such as calcium stearate or tin maleate, to minimize decomposition of the VDC polymer during the tire cure cycle.

It is also desirable to add a thickening agent to the polymer blend emulsion in order to impart a viscosity suitable for application to a rubber tire substrate. This viscosity should be at least about 37 Brookfield viscosity (No. 3 spindle) at 20° C. The thickening agent should be the last ingredient added. The thickener may be omitted when not required by the geometry of the substrate.

It is usually necessary to adjust the pH of the VDC copolymer emulsion prior to admixture with the elastomer latex, so that its pH value is compatible with that of the elastomer latex, so that a stable emulsion is formed upon admixture. Conventional bases, such as for example, sodium hydroxide, potassium hydroxide, and ammonium hydroxide, may be used for this purpose. The amount of base added is preferably sufficient to impart a pH in the range of about 6.5 to about 8 to the polymer blend emulsion. It is highly desirable to add the base shortly before admixture of the VDC polymer emulsion with the elastomer latex.

The ingredients of the polymer blend emulsion may be mixed by conventional batch or continuous mixing techniques. When batch mixing is used, the VDC polymer emulsion, after adjustment of pH, is preferably added to the elastomer latex rather than vice versa. The other ingredients, e.g., the wetting agent, stabilizer and thickener are added to the mixed emulsion.

The mixed polymer emulsion of this invention may be prepared in advance and stored in a suitable vessel until used. Alternatively, the mixed polymer emulsion may be prepared by continuous mixing techniques, as for example by bringing together flowing streams of VDC copolymer emulsion, elastomer latex, base in aqueous solution, and any other desired ingredients, which are preferably in aqueous solution or suspension. The base and other ingredients may be added to one or both of the emulsion streams prior to their admixture. For example, the base may be added to the VDC copolymer stream to adjust the pH of that stream to about 6.5 to about 8 prior to admixture of the VDC copolymer and elastomer emulsion streams. When the mixed emulsion is prepared by continuous mixing, it is advantageous to apply the mixed emulsion immediately, as for example by spraying, to the inner surface of the tire or other uncured rubber substrate.

Mixed polymer emulsions according to this invention contain from about 85 percent to about 25 percent of VDC copolymer and conversely from about 15 percent to about 75 percent by weight of elastomer, both based on the total weight of polymer (dry basis). Preferred blends are those containing from about 50 percent to about 70 percent by weight of VDC copolymer and conversely from about 50 percent to about 30 percent by weight of elastomer, both based on total polymer weight (dry basis).

The polymer blend emulsion described above may be applied to an uncured rubber substrate by conventional means, such as spraying or brushing, in such amounts as to give a dry VDC polymer/elastomer coating of desired thickness. Usually this desired thickness is in the range of about 1 to 10 mils (i.e. 0.001 to 0.010 inch). The preferred uncured rubber substrate is the inner surface of a green or uncured tire. The inner surface may be either the inner surface of the tire carcass or the exposed surface of the inner liner, depending on whether or not an inner liner is used.

It is not necessary to use an adhesive when the mixed polymer emulsion of this invention is applied to an uncured rubber substrate such as a green tire or inner liner bonded thereto. It is believed that some migration of sulfur occurs at the interface between the tire carcass or inner liner and the VDC copolymer/elastomer coating during curing, so as to bond the coating adherently to the tire carcass or inner liner. In other words, the coating and the inner surface of the tire are co-cured. However, applicant does not wish to be bound by any theory by way of explanation.

The water or other liquid medium of the polymer blend of this invention is evaporated, leaving a film of dry VDC copolymer/elastomer blend on the inner surface of the tire (either the carcass or the inner liner as the case may be), before the tire is cured. The blend is an intimate and esentially uniform mixture of the VDC polymer and the elastomer in which each is distributed substantially uniformly throughout the entire blend. This film becomes bonded to the tire as the tire is cured.

VDC copolymer/elastomer blends of this invention in dry form have low air permeability, high elongation, low modulus and high flex resistance at normal tire service temperatures. All of these properties can be measured by standard test methods. Elongation should be at least about 50 percent, as measured by normal test procedures. In addition, the VDC copolymer/elastomer coating 20 must remain adhered to the tire over a long period of time, preferably for the entire life of the tire. This quality can be evaluated by standard tire durability tests.

While this invention has been described with particular reference to forming a VDC copolymer/elastomer coating on the inner surface of an uncured tire (either a tire carcass or an inner liner bonded thereto), such coating can also be formed on other rubber substrates in accordance with this invention. Thus, for example, an uncured rubber sheet may be coated on one surface with a polymer blend emulsion of this invention, and this sheet may be bonded to a tire to form the inner liner thereof, or may be formed into an inner tube or other inflatable rubber articles. The VDC polymer/elastomer emulsion of this invention may be applied to a cured rubber substrate surface, as for example, the inside surface of a cured rubber tire (carcass or inner liner, as the case may be). However, it is usually necessary to clean a cured rubber surface and to apply an adhesive, prior to application of the mixed polymer emulsion. It is usually not economical to apply a polymer blend emulsion of this invention to a cured rubber substrate, because of the extra steps required when this mode of application is used.

This invention will now be described with reference to the examples which follow. The parts and percentages are by weight unless otherwise defined.

EXAMPLE 1

A coating composition was prepared by mixing an aqueous VDC copolymer emulsion with an aqueous elastomer emulsion. The VDC copolymer emulsion typically has a pH in the range of about 2 to about 4, which was adjusted to a pH in the range of about 6.5 to about 7.5 by addition of sodium hydroxide prior to mixing with the elastomer emulsion, which itself typically has a pH in the range of about 5 to about 8.

To the emulsion mixture (VDC copolymer and elastomer) were added various ingredients such as wetting agents, heat stabilizer and thickener in that order to enhance the coating ability of the mixture. A typical emulsion recipe is shown in Table 1.

TABLE 1

| Material | Amount |
|---|---|
| 1. VDC[1] copolymer emulsion | 1320 cc |
| 2. Sodium hydroxide (IN) | 270 cc |
| 3. Butadiene/acrylonitrile copolyer elastomer emulsion[2] | 680 cc |
| 4. Surfactant[3] | 10 gm |
| 5. Calcium Stearate[4] stabilizer | 80 gm |
| 6. Thickener[5] | 100 gm |

[1] A VDC copolymer latex (62% solids) containing at least about 90% (by weight) VDC, obtained as "Duran" 220 from the W. R. Grace & Co.
[2] A carboxylated latex obtained as "Chemigum" 520 (approximately 50% solids) from The Goodyear Tire & Rubber Company.
[3] Sodium Dioctyl Sulfosuccinate obtained or obtainable as "Aerosol" OT or "Cyanasol" from American Cyanamid.
[4] A dispersion of calcium stearate in water (60% solids).
[5] Paragum 141, obtained from Parachem Southern Co. and diluted with water to a 50% solution.

A typical viscosity of the resulting mixture was in the range of about 37 to 39 Brookfield Units using Spindle No. 3 at 12 rpm and a temperature of about 70° F.

EXAMPLE 2

Composites of uncured rubber substrates coated with the coating compositions of this invention were prepared and cured at about 300° F. for 15 minutes. The uncured rubber substrates were composed of natural rubber and styrene-butadiene rubber (SBR) in a weight ratio of about 70/30 (containing sulfur curative, zinc oxide, stearic acid, carbon black, rubber processing oil and accelerator(s), and age resistors, and having a thickness of about 0.03 to 0.035 inches. The coatings had a typical thickness of about 0.005 inches. The cured composites were then tested for air permeability. The sample preparation and test were conducted according to the following laboratory diffusion test procedure.

LABORATORY DIFFUSION TEST

A specimen is prepared in the form of a disc with diameter of ±1/16 inches and a thickness of from 0.020 to 0.26 inches. The prepared specimen is placed in what is called a cell on a porous plate. Pressure is applied to the sample side of the cell. The cell is immersed in a constant temperature water bath and the said pressure is adjusted to 48 pounds and the system allowed to equilibrate for three hours. The side of the cell opposite the pressure is connected to a manometer. The inlet manometer is closed off and its liquid level observed over designated periods of time to yield a manometer reading (M.R.) in milliliters per hour.

The results are shown in the following Table 2 where Sample A represents the rubber substrate without the coating and Samples B-D represent the substrates coated with the compositions of this invention.

TABLE 2

| Sample | Coating Composition | | Air Permeability[1] |
|---|---|---|---|
| | Materials And Their Ratio | | |
| A (Control) | — | — | 0.00532 |
| B | PVDC[2]/Neoprene | 75/25 | 0.00160 |
| C | PVDC[2]/Chemigum 520 | 50/50 | 0.00036 |
| D | PVDC[3]/Butyl[4] | 60/40 | 0.00196 |

[1] Diffusion rate (air) expressed as (Cu. Ft. air) (mils thickness)/(Sq. Ft. sample surface) (time in days) (psi pressure drop)
[2] Duran 220 obtained from W. R. Grace Co.
[3] Xu-30787.00 (DL 248A), a VDC-butadiene copolymer, obtained from the Dow Chemical Co.
[4] BL-100 obtained from Burke-Palmason Co.

EXAMPLE 3

Uncured steel belted radial ply pneumatic rubber passenger tires (P185/80 R 13) were obtained. The inner surface of tires (the surface of the tire which will become its inner surface exposed to its air chamber) were spray-coated with coating compositions and the tires identified as Samples A-D using, respectively, the coating compositions of Samples B-D of Example 2 with Sample A being a control, uncoated, tire. To facilitate the spray coating operation, the sidewall portions of the tires were temporarily pushed outwardly (inflated to their natural shape) so that a more even coating could be applied.

The coated tires were allowed to dry for about two hours.

A release precure lubricant was sprayed onto the inner surface of the tire to facilitate release of the tire from its curing bladder.

The tires were then cured in a tire cure press with the aid of a tire cure bladder by method known to those having skill in the art under conditions of heat and pressure.

The resulting tires were mounted on rims, inflated to 50 psig, and heated to a temperature of about 125° F., after the inflation pressure was readjusted to 50 psig and the air permeability test started. While maintaining the tires at the 125° F. temperature, their inflation pressures were monitored daily for about two weeks. The rate of air loss was then calculated by linear regression in terms of psig per day and presented in the following Table 3 as negative values because the slope of curve for air pressure versus time is negative. After the air permeability tests were run, the tires were subjected to a durability test, i.e., U.S. Department of Transportation (DOT) Test No. 571.109 (the standard 109 test modified by using a tire inflation pressure of 15 psig). In this test, the tires are mounted on rims, inflated to 15 psig, and run against a dynamometer under load and at desired speed until failure. The air barrier coatings in all tires except tire A (the uncoated control) were intact, i.e., neither cracking nor delamination was observed.

TABLE 3

| Tire | Average Rate of Air Loss (psi/day)[1] | Observed Condition of Coating After Tire Durability Test[3] |
|---|---|---|
| A (Control) | −0.41 | — |
| B | −0.21 | Intact |
| C | −0.16 | Intact |
| D | −0.29 | Intact |
| E[2] | −0.26 | Intact |

[1] Slope of curve for rate of air loss
[2] Coating composition was composed of 50/50 PVDC/styrene-butadiene rubber
[3] Tires were submitted to durability tests according to a modified DOT test (DOT test No. 571.109, using psig inflation pressure) and the condition of the coating observed after the test of the tires to tire failure The data in Table 3 demonstrate both low air permeability and good durability (i.e., absence of cracking or delamination) under test conditions.

While in accordance with the patent statutes, a preferred embodiment and best mode for the practice of the present invention has been disclosed, the scope of the invention is not limited thereto, but rather is measured by the scope of the attached claims.

What is claimed is:

1. An inflatable rubber article comprising
(a) a cured rubber substrate and
(b) a coating of a polymer blend of low air permeability and high elongation on the inside surface of said substrate, said blend comprising (1) from about 25 to about 85 percent by weight of a copolymer of vinylidene chloride with one or more halogen-free comonomers in which said vinylidene chloride constitutes from about 80 to about 95 percent by weight of said copolymer, and (2) from about 75 to about 15 percent by weight of an elastomer, based on the total weight of polymer present, said polymer blend being a substantially uniform intimate mixture of said vinylidene chloride copolymer and said elastomer in which each is distributed substantially uniformly throughout the entire blend, said coating being formed on said substrate by applying said vinylidene chloride copolymer and said elastomer in aqueous emulsion form to an uncured rubber substrate, evaporating the water of said emulsion and curing the substrate; said polymer having an elongation of at least 50 percent and an air permeability substantially less than that of an equal thickness of halobutyl rubber.

2. An article according to claim 1 in which the amount of vinylidene chloride copolymer is from about 50 to about 70 percent by weight and the amount of said elastomer is from about 50 to about 30 percent by weight.

3. An article according to claim 1 in which said elastomer is neoprene.

4. An article according to claim 1 in which said elastomer is acrylonitrile.

5. An article according to claim 1 in which said elastomer is a butyl polymer.

6. An article according to claim 1 in which said elastomer is a styrene-butadiene rubber.

7. An article according to claim 1 in which said elastomer is a vinyl pyridine terpolymer.

8. An article according to claim 1 wherein said substrate is a tire and said coating is applied to the inner surface of said tire.

9. An article according to claim 8 in which the air permeability of said coating is not greater than about 1/15 the air permeability of an equal thickness of halobutyl rubber.

10. An article according to claim 9 in which the thickness of said coating is from about 0.001 to about 0.010 inch.

11. An article according to claim 1 in which said vinylidene chloride copolymer and elastomer in emulsion form are applied to said uncored rubber substrate in the absence of an adhesive.

12. A coated rubber tire comprising a cured rubber tire substrate and a coating of low air permeability and high elongation on the inside surface of said substrate, said coating having an elongation of at least 50 percent and an air permeability substantially less than that of an equal thickness of halobutyl rubber, said coated tire being prepared by a process which comprises:
(a) combining an aqueous emulsion of vinylidene chloride copolymer with an aqueous emulsion of an elastomer in proportions and at a pH such that a stable mixed emulsion containing from about 25 to about 85 percent by weight of vinylidene chloride copolymer and from about 75 to about 15 percent by weight of said elastomer on the dry basis is formed, said vinylidene chloride polymer being a copolymer of vinylidene chloride and one or more halogen-free comonomers in which said vinylidene chloride constitutes from about 80 to about 95 percent by weight of said copolymer,
(b) applying said mixed emulsion to the inside surface of an uncured rubber tire; and
(c) curing said tire.

13. A coated rubber tire according to claim 12 in which said stable mixed emulsion contains from about 50 to 75 percent by weight of said vinylidene chloride copolymer and from about 50 to about 25 percent by weight of said elastomer on the dry basis.

14. A coated rubber tire according to claim 12 in which the pH of said mixed emulsion is from about 6.5 to about 8 and in which base is added to said vinylidene chloride polymer emulsion prior to admixture with said elastomer emulsion.

* * * * *